United States Patent [19]

Houston

[11] 4,378,817
[45] Apr. 5, 1983

[54] SLIDE VALVE ASSEMBLY

[75] Inventor: James L. Houston, Broken Arrow, Okla.

[73] Assignee: Superior Valve Corporation, Tulsa, Okla.

[21] Appl. No.: 310,233

[22] PCT Filed: Mar. 20, 1981

[86] PCT No.: PCT/US81/00379

§ 371 Date: Jul. 6, 1981

§ 102(e) Date: Jul. 6, 1981

[87] PCT Pub. No.: WO82/03258

PCT Pub. Date: Sep. 30, 1982

[51] Int. Cl.³ .......................... F16K 3/16; F16K 25/00
[52] U.S. Cl. ..................................... 137/315; 137/375; 137/454.2; 251/204; 251/328
[58] Field of Search .................. 137/315, 454.2, 454.6, 137/375; 251/204, 326, 327, 328, 329

[56] References Cited

U.S. PATENT DOCUMENTS

| | | | |
|---|---|---|---|
| 1,808,715 | 6/1931 | Reynolds | 251/327 |
| 2,344,747 | 3/1944 | Sperry et al. | 137/315 |
| 2,793,002 | 5/1957 | Kellar | 251/328 |
| 3,511,261 | 5/1970 | Bick et al. | 251/326 |
| 3,557,822 | 1/1971 | Chronister | 137/315 |
| 3,837,356 | 9/1974 | Selep et al. | 251/327 |
| 3,964,507 | 6/1976 | Jandrasi et al. | 137/375 |
| 3,976,094 | 8/1976 | Jandrasi et al. | 137/375 |
| 4,042,207 | 8/1977 | Nehrlich et al. | 251/326 |
| 4,316,483 | 2/1982 | Jandrasi | 137/315 |

Primary Examiner—George L. Walton
Attorney, Agent, or Firm—Robert E. Massa

[57] ABSTRACT

A slide valve for high temperature, high pressure use provides for easy access to internal components for replacement or repair, and also provides for easy and secure adjustment of the valve components from the exterior of the valve even while the valve is in position in its process line. The slide valve includes a body having a throat providing for fluid passage through the body, a shoulder within the body including passage means communicating with the throat, a side portion extending transversely from the body and having an interior space communicating with the throat, a valve seat removably positionable upon the shoulder, a guide member removably positionable within the body adjacent the shoulder and extending into the side portion, a closure member positionable slidably upon the guide member for opening and closing the passage means, and a wedge member positionable adjustably between the shoulder and the guide member. The wedge member is adjustable exteriorly of the body.

6 Claims, 10 Drawing Figures

SLIDE VALVE ASSEMBLY

DESCRIPTION

Technical Field

This invention relates to slide valves for high temperatures, high pressure use in the various process industries where the valves are subject to considerable wear because of the fluid flow and operating conditions.

Slide valves are used extensively in the process industries, and are known to be subject to corrosion, erosion, and improper adjustment. In many uses, the extremely high fluid temperature will cause some of the valve components to expand, causing inadequate control of the process fluid. Most of the time, because of the design of the valves, the valves are not capable of compensatory adjustment without being removed from the process line, or at least temporarily by-passed.

Background Art

Some of the typical slide valves found in the prior art are described in the following U.S. Pat. Nos.: 3,511,261 Bick et al, 3,837,356 Selep et al, 3,964,507 Jandrasi et al, 3,976,094 Jandrasi et al, 4,042,207 Nehrlich et al.

Disclosure of Invention

Therefore, the primary object of this invention is to provide a slide valve which is inexpensive, easy to manufacture, and easy to use.

Another object of this invention is to provide a slide valve which is resistant to excessive corrosion and erosion due to the operating conditions of the fluid flow.

Still another object of this invention is to provide a slide valve which is easily repairable.

Still another object of this invention is to provide a slide valve which is easily adjustable.

Still another object of this invention is to provide a slide valve in which some of the internal valve components may be adjusted from exteriorly of the valve.

In summary, I have designed a slide valve for use in the process industries involving high temperature, high pressure fluid flow. I have designed my valve particularly to be adaptable for easy and efficient repair and adjustment.

In some process industries, such as the chemical industry or in oil refineries, many control valves are needed in the fluid lines. Too often, with many types of valves, when the valve becomes defective, the fluid line must be shut off upstream of the valve and the valve removed entirely from the line so that it can be repaired. Removal from a process line, disassembly, repair, and subsequent re-assembly and re-installation of the usual large and heavy control valve is a difficult, inefficient, and time-consuming operation.

My invention eliminates many of the problems which I have described, because I have designed my slide valve to be capable of being repaired without having to be removed from the process line, and also to be capable of being adjusted as to certain interior components even without interruption of the process flow.

High temperature process conditions will almost invariably cause expansion and mis-alignment of some of the operating components of a slide valve, consequently causing a lack of adequate control over the process conditions. Particularly does mis-alignment occur in relation to components which are exposed to the process conditions interiorly of the valve and at the same time are exposed to conditions exteriorly of the valve, such as when an adjustment component includes one portion inside the valve and an integral portion outside the valve. For example, a typical slide valve might include a screw member cooperating with a slide component inside the valve to control the positioning of the slide component against a valve seat while the screw member passes through the wall of the valve to be adjustable from the exterior. Thus, in high temperature process conditions, an adjustable component like this is subject to the extremes of temperature from the interior and from the exterior and will not likely retain its alignment. In addition, slide valves designed for high temperature use usually include a multitude of interior components which, because of the shape and material of each component may result in unequal expansion of each component in relation to others causing inadequate adjustment of the slide valve. However, I have designed my valve so that, despite any expansion of one component relative to another component, my valve may be immediately and easily adjusted.

These and other objects of my invention will become apparent from the accompanying drawings and description and claims which describe my slide valve as comprising a body having a throat allowing for fluid passage therethrough, a shoulder within the body including passage means communicating with the throat, a side portion extending transversely from the body and having an interior space communicating with the throat, a valve seat positionable upon the shoulder, a guide member removably positionable within the body adjacent the shoulder extending into the side portion, a closure member positionable slidably upon the guide member for opening and closing the passage means, and a wedge member positionable adjustably between the shoulder and the guide member.

As I have stated above, the interior components of a slide valve of this type for the process industry are usually subjected to extremes of temperature and pressure which cause mis-alignment of some interior components and require a great deal of time spent for adjustment and repair.

In a slide valve of the type which I have described, a closure member must control the flow of fluid by a close tolerance upon a valve seat, and this close tolerance should be maintainable with a minimum of time, attention, and effort. The closure member is held in position by some means of guide along which the closure member moves, and, occasionally, this guide is adjustable.

In my invention, I have designed a slide valve in which the close, critical adjustment of the closure member in reference to the valve seat, as well as the adjustment of the guide, may be accomplished from exteriorly of the slide valve. I have accomplished this by providing a wedge member which cooperates with the guide and with a valve seat component so that proper adjustment of the closure member in relation to the valve seat and to the guide may be accomplished very easily. Further, the adjustable wedge member of my slide valve is out of the path of the flow of fluid through the valve, and is less subject to distortion from heat and pressure.

BRIEF DESCRIPTION OF DRAWINGS

FIG. 3 is a sectional view along the lines 3—3 of FIG. 1.

BEST MODE FOR CARRYING OUT THE INVENTION

Figure 1:
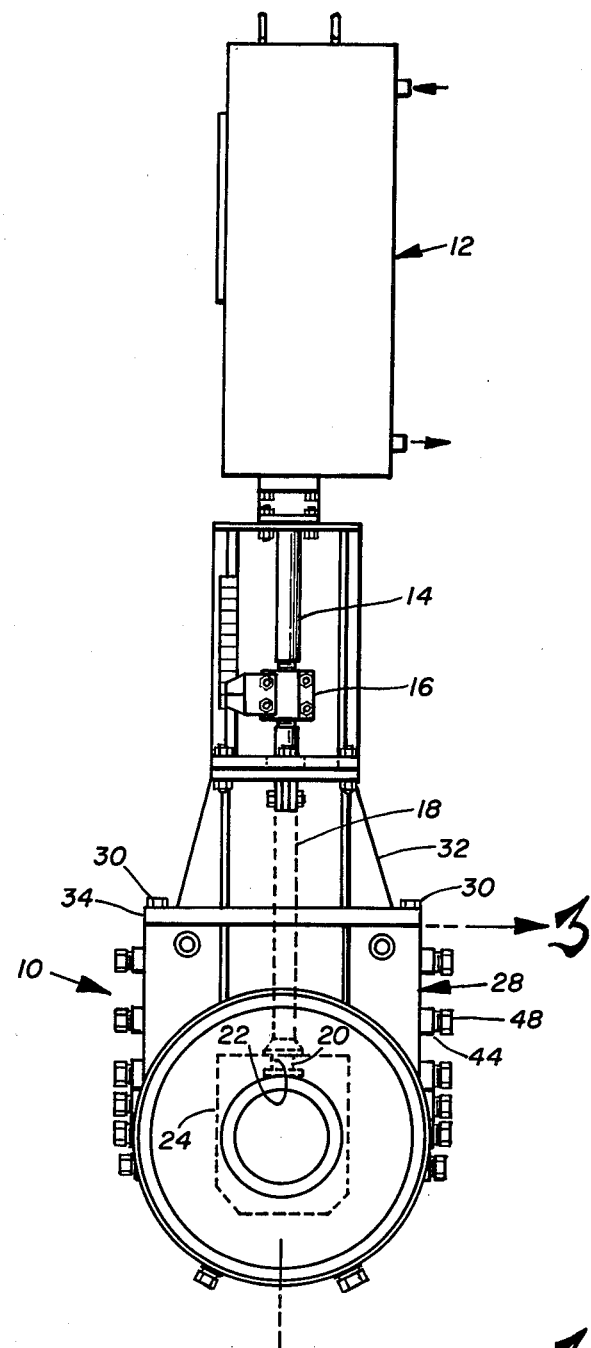
FIG. 1 is a front elevational view of a slide valve according to my invention.
Figure 2:
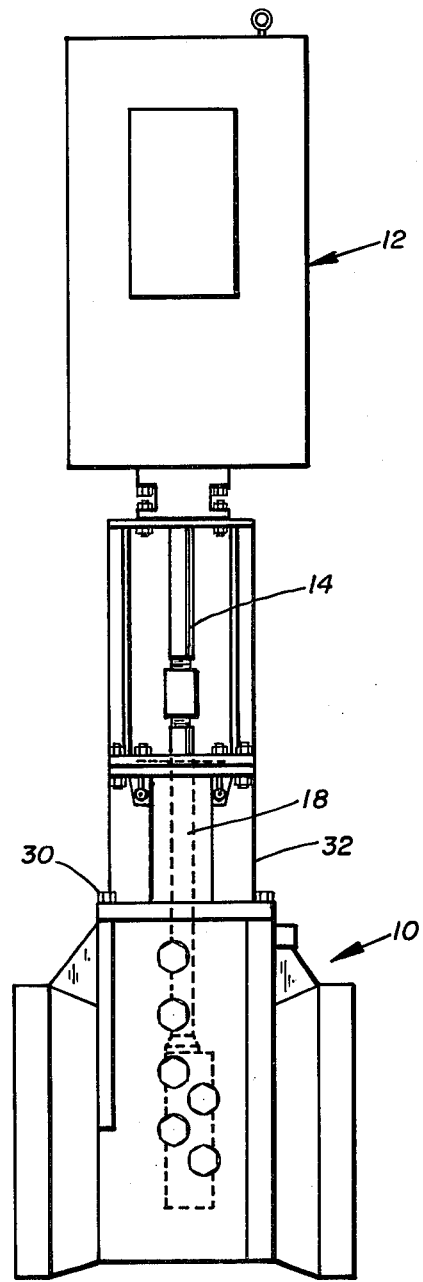
FIG. 2 is a side elevational view of a slide valve according to my invention.

FIG. 1 describes a slide valve 10, generally according to my invention as it would be in assembled form ready for installation in a typical process line, such as a high temperature, high pressure process line of a chemical plant or oil refinery. FIG. 2 is a side elevational view of the valve in the same position. Usually, a valve in such process lines is adaptable to be controlled by hydraulic or electronic and hydraulic or pneumatic means with additional control means provided by manual means. Any of such conventional type of control means for a slide valve is considered to be shown schematically in control unit 12, generally, and it is intended to include either manual, hydraulic, electronic, or pneumatic means, or any suitable combination of these. The suitable control means operate to cause the desired slidable movement of shaft 14 which, through connection 16, is connected to shaft 18 which includes a flanged member 20 fitting closely into a cut-out portion 22 of a slidable closure member 24.

Figure 4:
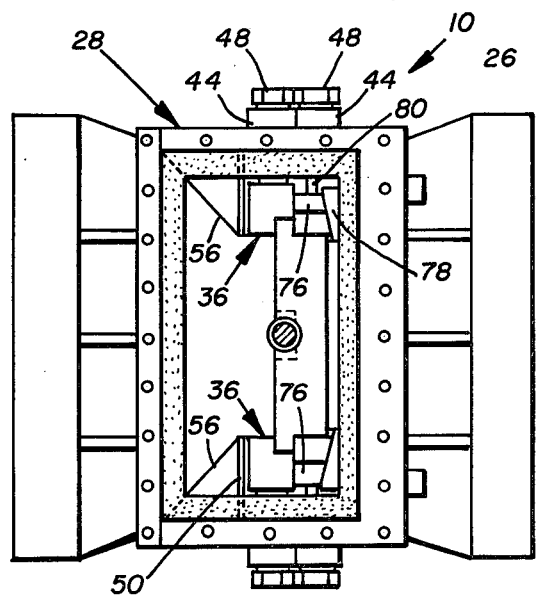
FIG. 4 is a top plan view of a slide valve according to my invention along the lines 4—4 of FIG. 3.
Figure 5:
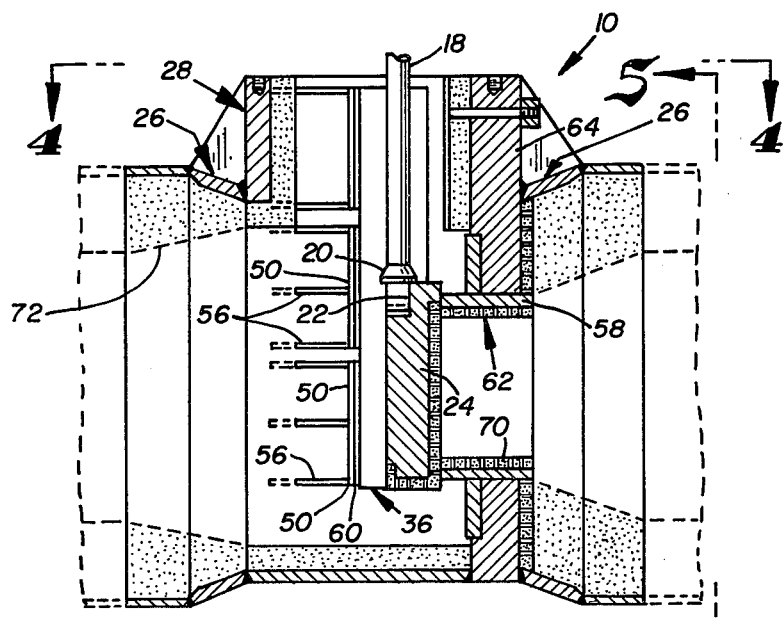
FIG. 5 is a front elevational view, partly in section, along the lines 5—5 of FIG. 3.

Referring specifically to FIGS. 3, 4, and 5, I have described my slide valve 10 as comprising a body 26, generally from which extends a side portion 28, generally. Side portion 28 is removably attachable, as by bolts 30, to a typical stuffing box 32 through which shaft 18 passes. A cover 34 is secured to stuffing box 32 and is held in sealable condition on top of side portion 28.

Figure 4A:
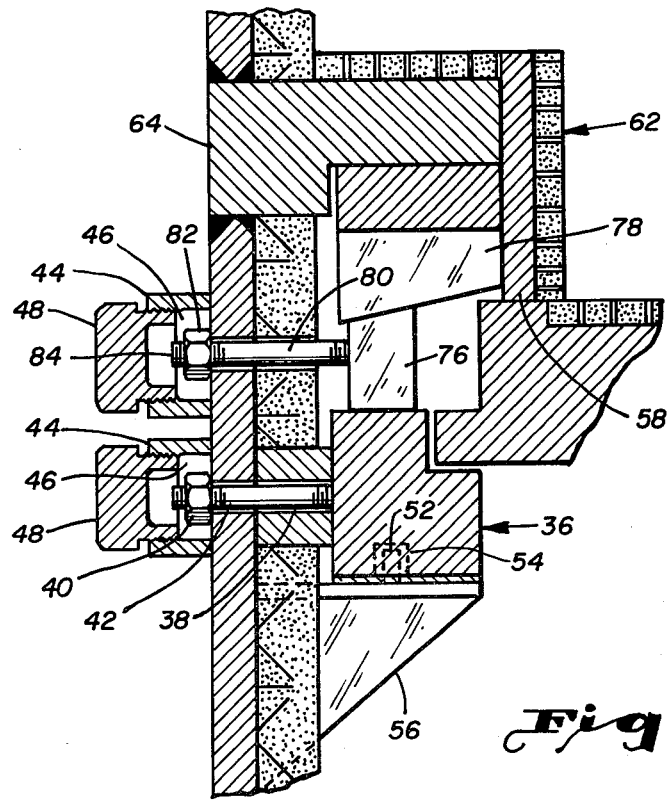
FIG. 4a is a top plan view, partly in section, of a portion of my slide valve and shown in FIG. 4.
Figure 4B:
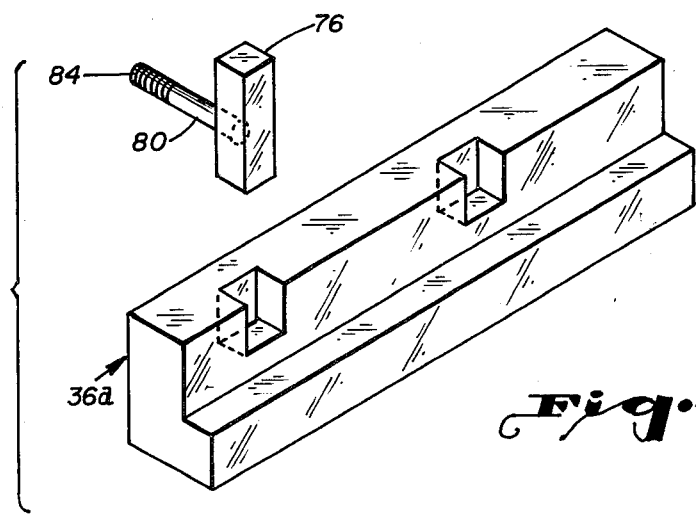
FIG. 4b is a perspective view of a guide member and wedge member of my invention showing an alternate design for cooperation of the two components.
Figure 7:
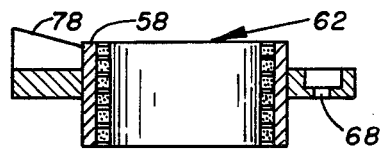
FIG. 7 is a sectional view along the lines 7—7 of FIG. 6.

As shown in detail in FIGS. 3 through 5, closure member 24 moves slidably along a guide member 36, generally, (or 36a as shown in FIG. 4b), in a manner that closure member 24 will open and close the passageway of the slide valve to control the flow of fluid through the valve. Guide members 36 and 36a are held in position inside the slide valve within the body 26 by studs 38 secured to the guide members and passing through the body wall and which are readily adjustable from the exterior of the slide valve by operation of nuts 40 on threaded portions 42 of the studs. As shown clearly in FIG. 4a, each nut 40 may have a half coupling 44 positioned over it which is then welded in place and which may then be packed with refractory material 46 and sealed with plug 48. Other externally exposed nuts, bolts, or caps may be similarly insulated. For easy and quick adjustment or repair of guide member 36, plug 48 and refractory material 46 may be easily removed to gain access to nut 40.

As shown clearly in FIGS. 3, 4, and 4a, guide member 36 is braced in position against a brace member 50 which may include guide pins 52 (as shown in FIG. 4a) entering openings 54 in guide member 40. Brace member 50 may also include additional braces 56.

Guide member 36 is adaptable to provide for close adjustment of closure member 24 against valve seat 58 by the addition of a suitable shim member 60. Valve seat 58 is a part of valve seat member 62, generally, which is removably securable to shoulder 64 by means of taps 66 (shown in FIG. 5) passing through openings 68 in valve member 62 and entering cooperating threaded holes in shoulder 64 (not shown). Valve member 62 provides passage means 70 communicating with throat portion 72 of body 26. Shoulder 64 may be secured to body 26 and side portion 28 by any conventional means, such as welding. Body 26 may be installed in a typical process pipe system by any conventional means, such as having flanges secured to each end and being bolted to cooperating flanges of the pipe system.

Figure 6:
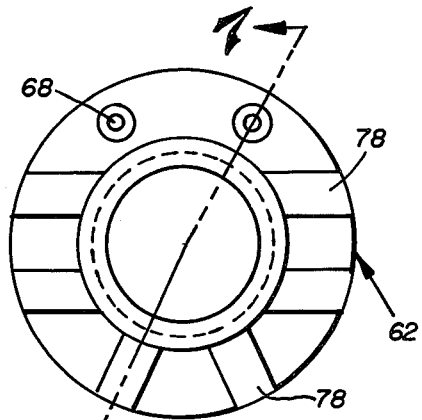
FIG. 6 is a front elevational view of a throat component of a slide valve according to my invention.
Figure 6A:
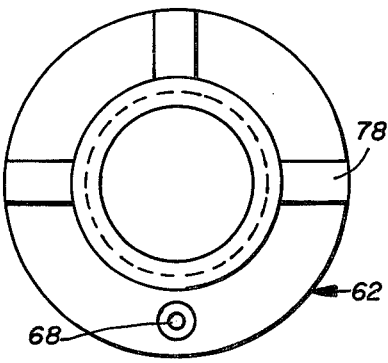
FIG. 6a is a front elevational view of a modified form of throat component according to my invention.
Figure 5:
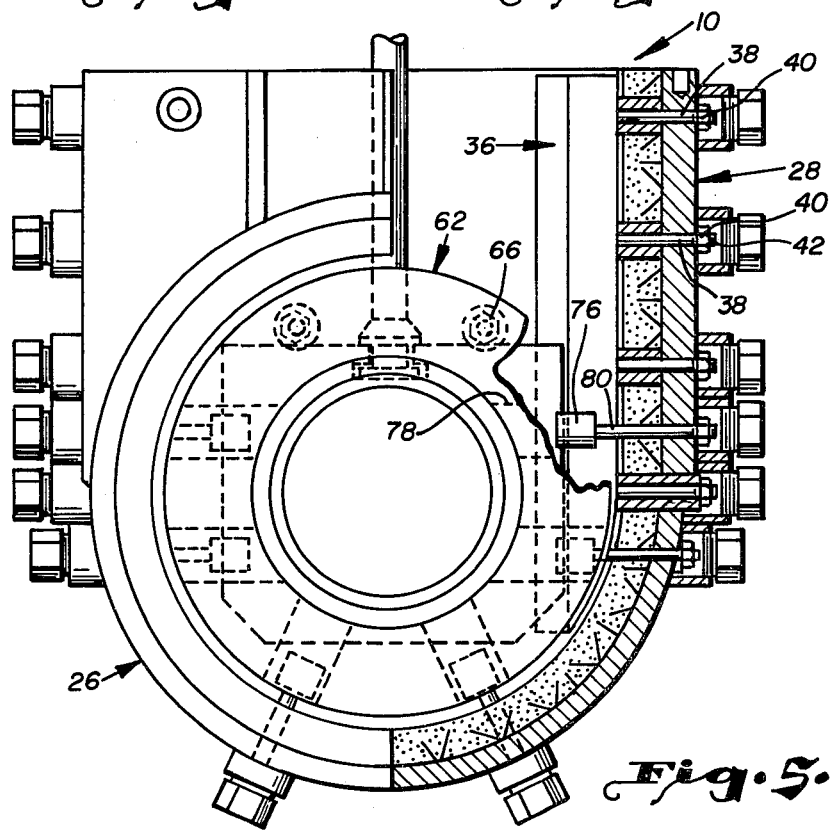

As described in FIGS. 4 and 4a, a wedge member 76 moves slidably and adjustably between guide member 36 and a wedge-shaped portion 78 of valve member 62. As noted above, wedge-shaped portion 78 is preferably integral with valve member 62 so that valve member 62 may be removable and adjustable as a unit, for better adjustable control of valve seat 58, but wedge-shaped portion 78 may be made integral with shoulder 64. Wedge member 76 is held in position and is controlled slidably by adjustment of a stud 80 secured to wedge member 76 and passing through the wall of the slide valve and adjusted by turning of a nut 82 along a threaded portion 84 of stud 80. FIG. 6a describes a modified form of valve member and is described as valve member 62a, and describes one method of modifying the structure of removable valve member for different sized slide valve.

As shown in the sectional views, the interior of the slide valve 10 is preferably lined with any conventional type of insulation or erosion-protected material, usually either ceramic or metallic. Such materials are well known in the art and greatly enhance the life of valves operating under extreme process conditions.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A slide valve comprising:
  a body having a throat allowing fluid passage therethrough,
  an annular shoulder within the body including passage means communicating with the throat,
  a side portion extending transversely from the body and having an interior space communicating with the throat,
  a valve seat member removably positionable upon the shoulder,
  a guide member removably positionable within the body adjacent the shoulder, extending into the side portion,
  a closure member positionable slidably upon the guide member for opening and closing the passage means, and
  a wedge member positionably adjustable between a portion of the seat member and the guide member and slidably upon the seat member portion and the guide member to maintain close critical adjustment of the closure member in reference to the seat member, as well as the adjustment of the guide member, and wherein the wedge member is adjustable from exteriorly of the valve body without disassembling the valve elements.

2. A slide valve as described in claim 1 wherein the seat member portion includes a wedge-shape and the wedge member is positionable between the wedge-shape and the guide member.

3. A slide valve as described in claim 2 which includes adjustment means securable to the guide member and passing through an opening in the body for adjustably positioning of the guide member from exteriorly of the body.

4. A slide valve as described in claim 3 wherein the adjustment means securable to the guide member includes nut and bolt means.

5. A slide valve as described in claim 1 which includes adjustment means securable to the guide member and passing through an opening in the body for adjustably positioning of the guide member from exteriorly of the body.

6. A slide valve as described in claim 5 wherein the adjustment means securable to the guide member includes nut and bolt means.

* * * * *